United States Patent
Powell

(10) Patent No.: US 8,418,212 B2
(45) Date of Patent: Apr. 9, 2013

(54) METHOD AND SYSTEM OF PROVIDING DIGITAL VIDEO REMODULATION

(75) Inventor: Carl Marshall Eliot Powell, Gaithersburg, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1775 days.

(21) Appl. No.: 11/694,165

(22) Filed: Mar. 30, 2007

(65) Prior Publication Data
US 2008/0240229 A1   Oct. 2, 2008

(51) Int. Cl.
*H04N 7/18*   (2006.01)
(52) U.S. Cl. .................. 725/82; 725/133; 709/219
(58) Field of Classification Search ............. 725/74–85, 725/100, 131–134, 139–142, 151–153; 709/217–231
See application file for complete search history.

(56) References Cited

U.S. PATENT DOCUMENTS

| | | | | |
|---|---|---|---|---|
| 5,936,660 A * | 8/1999 | Gurantz | ............ | 725/71 |
| 5,999,207 A * | 12/1999 | Rodriguez et al. | ...... | 348/14.03 |
| 6,134,419 A * | 10/2000 | Williams | ............ | 725/151 |
| 6,452,923 B1 * | 9/2002 | Gerszberg et al. | ...... | 370/352 |
| 6,622,307 B1 * | 9/2003 | Ho | ............ | 725/120 |
| 7,672,298 B2 * | 3/2010 | Gerszberg et al. | ...... | 370/354 |
| 2002/0031224 A1 * | 3/2002 | Basawapatna et al. | ...... | 380/211 |
| 2003/0189666 A1 * | 10/2003 | Dabell et al. | ............ | 348/389.1 |
| 2005/0028208 A1 * | 2/2005 | Ellis et al. | ............ | 725/58 |

* cited by examiner

*Primary Examiner* — Annan Shang

(57) ABSTRACT

An approach is provided for distributing video signals. A digital video feed is received at a media distributor that includes a plurality of decoders and a corresponding plurality of modulators, wherein the digital video feed includes a plurality of video channels. The decoders decode the digital video feed to output analog video signals. The modulators modulate the analog video signals; and a combiner combines the outputs of the modulators to generate a channelized video signal.

20 Claims, 9 Drawing Sheets

METHOD AND SYSTEM OF PROVIDING DIGITAL VIDEO REMODULATION

BACKGROUND INFORMATION

Digital video transmission has rapidly grown in popularity because of the robustness of features and services. Notably, this technology provides many benefits to the consumer in the form of access to an expansive channel lineup and on-demand/interactive services, while minimizing the amount of bandwidth needed by the service provider for these services. Such transmission can be delivered via satellite, cable or fiber optics. For example, cable systems can employ 6 MHZ analog video and/or digital Quadrature Amplitude Modulation (QAM) channels that are frequency division multiplexed (FDM) across the 500-1000 MHZ cable bandwidth. In typical satellite systems, several compressed digital video programs are time division multiplexed (TDM) into a single 10-40 Mbit/s Quadrature Phase Shift Keying (QPSK) or Binary Phase Shift Keying (BPSK) modulated C- or K-band carrier. However, this digital transmission technology imposes a number of technical requirements that may be hard to satisfy using existing house video wiring systems. For example, in order to decode digital video into an analog form that can be viewed by traditional television sets, a converter box is required for each set. In some instances, this can be problematic as there may be no room available for the box close to the set and within line-of-sight from the viewing area for operation of a remote controller.

Many digital video implementations also require a higher signal-to-noise (S/N) ratio than analog systems to produce acceptable video images. Installations that have old wiring or video splitters in the walls may have difficulty achieving the required signal-to-noise ratios. Moreover, such wiring systems can even block the entire spectrum of the digital transmissions if they were installed before deployment of digital video transmission standards. Moreover, older splitters can also block the return channel for interactive services over the digital video box, thereby preventing their use by the customer. Since each decoder box outputs only a single channel, it is also difficult to use such features as Picture In Picture (PIP) and recording one channel while viewing another.

Traditional approaches to the above issues include rewiring of the premises with cabling that is suitable for digital video, and utilizing transmitter/receiver units to bypass the wiring. Rewiring for most premises can be prohibitively expensive. Both of these approaches require a device at each set; and even two devices are needed where Picture-In-Picture (PIP) or simultaneous recording is being used. The retransmission boxes also consume bandwidth in the facility (either Radio Frequency spectrum or Internet bandwidth), and necessitates a patchwork of separate devices to be linked together.

Therefore, there is a need for providing digital video transmission over extant wiring facilities without incurring high deployment costs for the service provider or the consumers.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION

An apparatus, method, and software for providing video remodulation are described. In the following description, for the purposes of explanation, numerous specific details are set forth in order to provide a thorough understanding of the various exemplary embodiments. It is apparent, however, to one skilled in the art that the various exemplary embodiments may be practiced without these specific details or with an equivalent arrangement. In other instances, well-known structures and devices are shown in block diagram form in order to avoid unnecessarily obscuring the exemplary embodiments.

Although the various embodiments are described with respect to digital video signals, it is contemplated that these embodiments have applicability to other digital media and content (e.g., audio, images, textual information, etc.).

Figure 1:
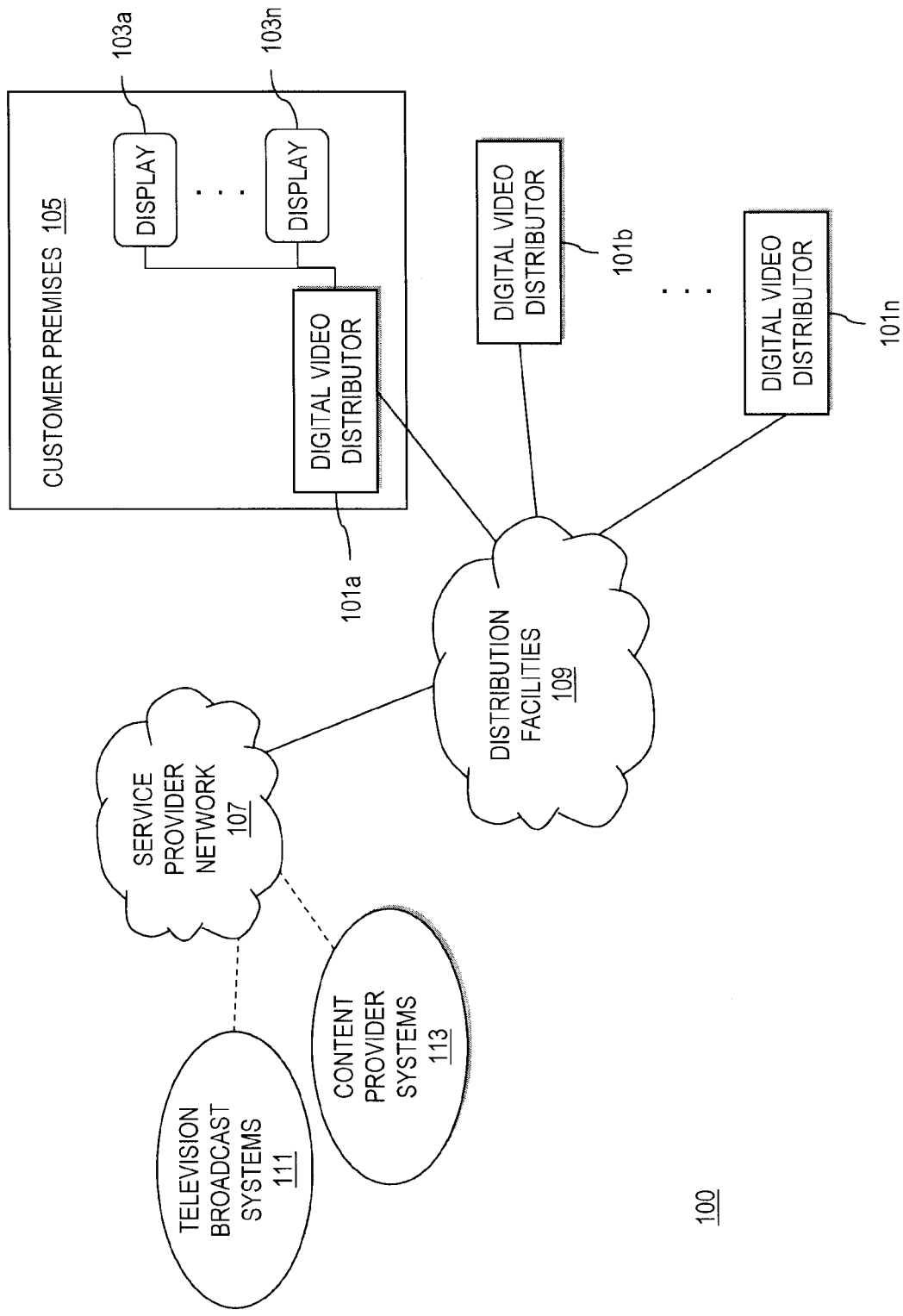
FIG. 1 is a diagram of a video system capable of providing digital video remodulation, according with an exemplary embodiment.

FIG. 1 is a diagram of a video system capable of providing digital video remodulation, according with an exemplary embodiment. A communication system 100 provides video (and/or audio, images, textual, etc.) services to users via digital media distributors 101; each of the media distributors 101a-101n is configured to accept, for example, a digital video feed and remodulate the feed to output analog signals. In other words, the process of converting the digital video signals to their analog equivalent entails decoding and subsequent modulation; thus, this process can be termed "remodulation." These analog signals can then be distributed to one or more displays 103 over traditional residential wiring within the customer premises 105, which can be a residential or commercial dwelling.

Under this scenario, the source of the digital video feed is a service provider network 107, which utilizes a distribution facility 109 to transport the digital video feed over, for example, an optical network, coaxial cable network, or other broadband systems. Because video content is bandwidth intensive, the transmission facilities to the media distributors 101 can utilize fiber optic cables or other high capacity transmission media (e.g., Digital Subscriber Line (DSL) connections, cable television connections, etc.).

For efficient transmission of digital video information, video encoding is employed to compress the digital information. The compressed digital information can be in form of a digital video format, such as MPEG (Motion Picture Experts Group), MPEG-2, MPEG-4, ITU H.261 and H.263, CCIR-601, Rp125, etc. For example, a video decoding mechanism for the MPEG standard is detailed "ISO/IEC CD 13818: Information technology—Generic coding of moving pictures and associated audio information," Dec. 1, 1993 (which is incorporated herein by reference in its entirety). Alternatively, the compressed digital information can be in a JPEG (Joint Photographic Experts Group) format, if the source is the image source or the text source.

The service provider network 107, as the administrator of the video service, can obtain video content from television broadcast systems 111 or other content service provider systems 113. Hence, the service provider network 107 includes an administrator system (not shown) for operational and management functions to deploy the video services. The service provider network 107 also has connectivity to a public data network (not shown), such as the global Internet (or World Wide Web), whereby the administrator system can be accessed by a remote host, for example.

As mentioned, it is recognized that the video distribution industry is a champion of digital video, in part, because digital video can support greater user functionality with relatively less bandwidth. In general, although digital video systems provide better utilization of resources than analog video systems, such digital systems require a converter to translate from the digital domain to the analog domain. The analog domain is employed by most legacy and currently available video systems. These converters typically require high signal-to-noise (S/N) ratios, bidirectional communications and cabling that is incompatible with the traditional wiring in many residential spaces.

Based on the above recognized problem, the system 100 uses the digital media distributors 101 to convert from the digital domain to that of the analog without the need to upgrade the wiring infrastructure. Effectively, each of the digital media distributors 101a concentrates multiple converters within a single housing at a location close to an inlet point for the digital video feed. As will be further explained, the channels that are requested from each video display 103 are then modulated onto separate analog channels so that they can be delivered within the customer premises 105 on the existing video wiring. Furthermore, a remote control can send commands to the digital converter using existing wireless techniques (e.g., infrared or radio frequency (RF) transmission).

Figure 2:
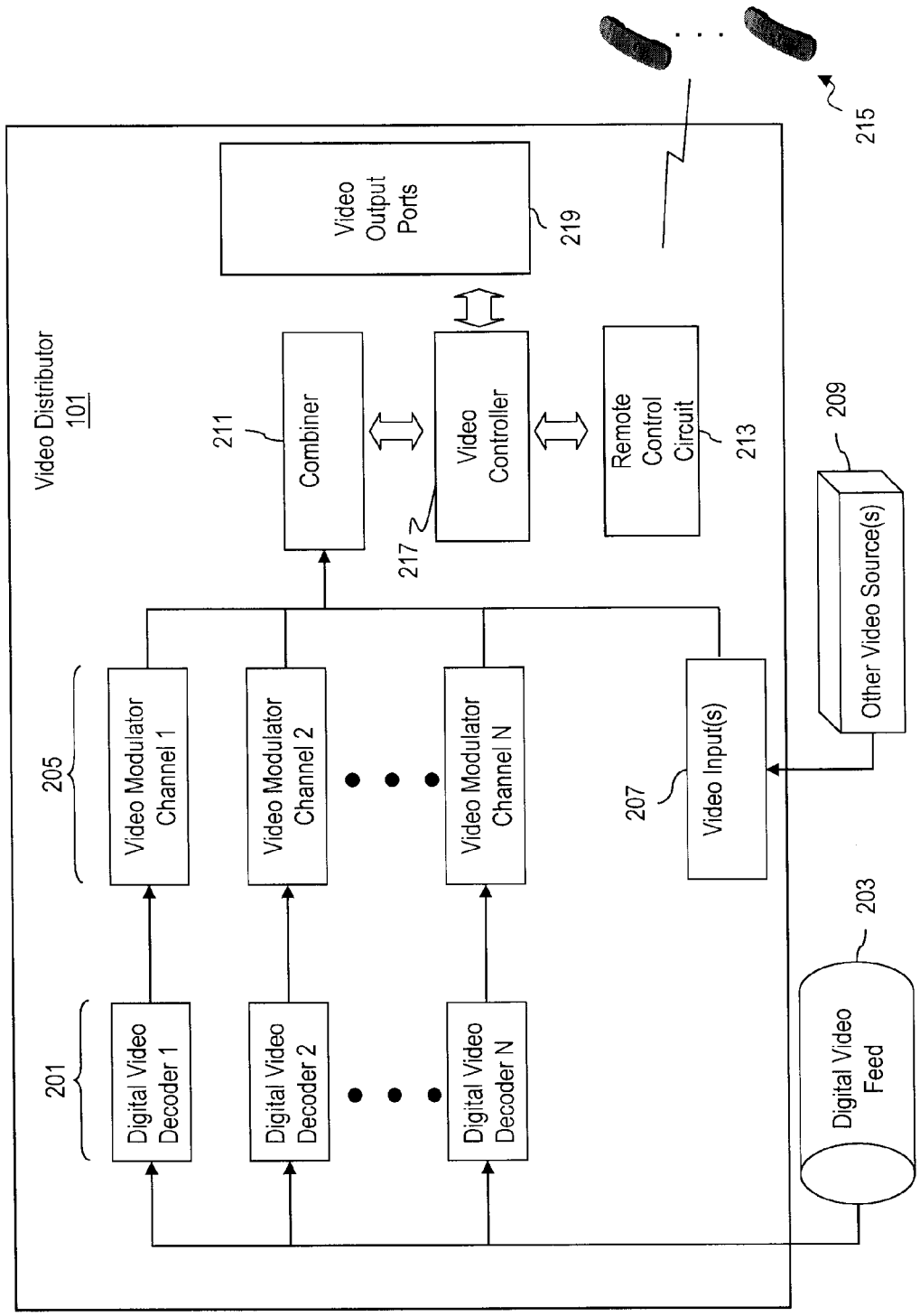
FIG. 2 is a diagram of a media distributor configured to distribute video signals, according to an exemplary embodiment.

FIG. 2 is a diagram of a media distributor configured to distribute digital video as analog signals, according to an exemplary embodiment. A media distributor 101 utilizes a set of digital video decoders 201, which receives a digital video feed 203 and decodes the digital stream to corresponding video modulators 205. In this configuration, the media distributor 101 can be denoted as a "video distributor." The video decoders 201 can include hardware (e.g., digital-to-analog (D/A) converter), software, etc. to decode the digital video feed using any of a number of encoding techniques with which the video bitstream has been encoded. As mentioned, the video format may involve data compression, and thus, the video decoders 201 would include a decompression component.

As shown, in addition to the digital video feed 203, the distributor 101 includes one or more separate video inputs 207, which can receive video signals from a variety of video sources 209. These sources 209 can include either digital or analog devices—e.g., a DVD (Digital Versatile Disc) player. The outputs of the modulators 205 are then combined using a combiner 207 and sent out over traditional wiring.

The output of the decoders 201 can be any variety of analog video formats—e.g., composite video, component analog video, etc., depending on requirements of the displays 103. Also, exemplary television formats utilized by the display 103 include NTSC (National Television System Committee) video and PAL (Phase Alternation by Line) video. The NTSC line rate is 525 lines per frame, while the PAL line rate is 625 lines per frame.

Each video modulator 205 is tuned to a particular video channel. This configuration allows a user to switch between the outputs of the different digital decoders 201 simply by changing the channel on their analog video device (e.g., 103a). During operation, according to one embodiment, one decoder/modulator pair is designated for each video display device 103; in this manner, different video sources can be viewed simultaneously. Thus, the video display device 103 can be left on the analog channel allocated to it.

The user can change the channel output by the digital decoder 201 (and hence the video being sent over the analog channel) using a wireless remote system, including a remote control circuit 213 in communication with one or more remote control devices 215. The remote control devices 215 can be configured to use infrared, or radio frequency (RF) technology to transmit signals over a predetermined range to properly permit situating the video devices 103 throughout the customer premises 105. This allows full access to all of the features of the digital system without requiring a device collocated with the set and independent of the quality of the wiring.

Additionally, a video controller 217 is coupled to the remote control circuit 213 to receive commands from the remote control devices 215. The video controller 217 supports a rich set of functionalities, and outputs to the displays 103 via the video output ports 219. That is, the user can change the analog channel of the display (or set) 103 to enable a variety of video display configurations, such as having all the sets 103 in the premise 105 show a single video feed or effecting a monitoring capability by allowing parents to remotely observe the program their child is watching (as later described in FIGS. 7 and 8, respectively).

Figure 3:
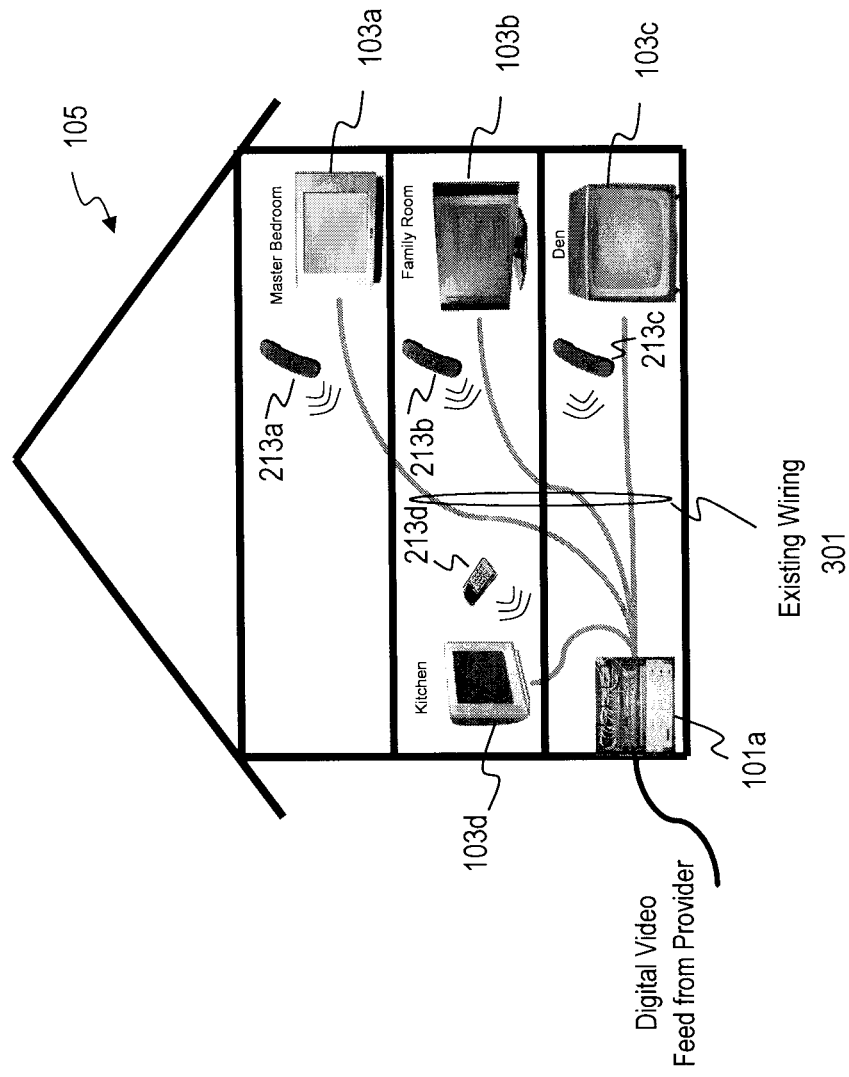
FIG. 3 is a diagram of an exemplary deployment of the media distributor of FIG. 2 within a customer premises, according to an exemplary embodiment.

FIG. 3 is a diagram of an exemplary deployment of the media distributor of FIG. 2 within a customer premises, according to an exemplary embodiment. In this example, the customer premises 105 is a residential dwelling having multiple displays (sets) 103a-103d situated in various locations through the home, such as the master bedroom, family room, den and kitchen. A media distributor 101a, as a customer premises equipment (CPE) can be placed at any convenient location for receipt of a digital video feed, and within range of the remote control devices 215a-213d. Each of the remote control devices 215a-213d can control programming or the channel that is transmitted to the respective displays 103a-103d. In addition, the remote control devices 215a-213d can provide different functions depending on the user—e.g., a parental user can impose programming restrictions as well as enable a monitoring function. Moreover, such a user can instruct the media distributor 101a, via a remote control device, to broadcast the same channel to all the displays 103a-103d. These functions are more fully described in FIGS. 5-8.

The media distributor 101a effectively provides a small scale cable TV system within the dwelling 105; as such, integration of other sources of video can be readily supported. As shown in FIG. 2, the media distributor 101a can provide one or more video inputs 207. For example, feeds from surveillance cameras or baby monitoring systems can be added to the "channel lineup" simply by connecting them to additional video modulators for different analog channels. In addition, DVD library systems or digital video recorder systems can be connected to the media distributor 101a to allow on-demand access to an entire video library from anywhere in the house without requiring a separate player and media for each set 103a-103d. Integration of these functions is readily achieved with the centralized media distributor 101, which can accept radio or infrared inputs from the user through a remote control device 215. In the alternative, the media distributor 101 itself can be equipped with an interface (not shown) for controlling the video signals, with at least the functionalities of the remote control device 215.

Figure 4:
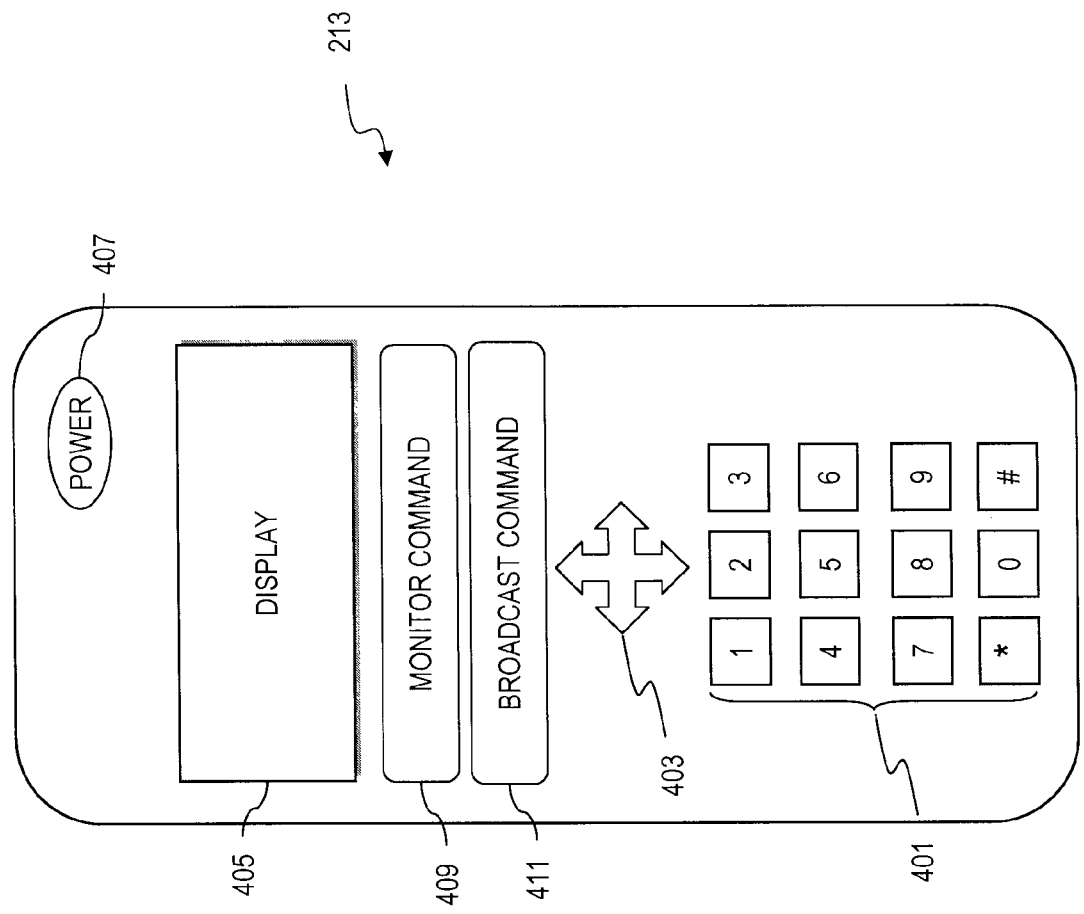
FIG. 4 is a diagram of a remote control device capable of communicating commands to the media distributor of FIG. 2, according to an exemplary embodiment.

FIG. 4 is a diagram of a remote control device capable of communicating commands to the media distributor of FIG. 2, according to an exemplary embodiment. By way of example, the remote control device 215 can be utilized to control the media distributor 101 as well as the corresponding display 103. The device 215, in an exemplary embodiment, includes a key pad 401 for a user to select a channel or input other commands. In addition, a cursor controller 403 can be provided to perform a host of functions, including channel selection, volume control, display setting control, etc. The remote control device 215 can also include a display 405 (e.g., LCD (liquid crystal display)), which can indicate the user inputs, provide an indicator of the present programming and functions, etc. Further, the display 405 can be used in conjunction with the cursor controller 403 to implement soft key functions, thereby providing more flexibility with respect to the user interface for the device 215. A power button 407 is also included for powering down the media distributor 101 and/or the display 103.

In this example, the remote control device 215 is configured with "hot" buttons 409 and 411 to initiate, respectively, a monitor command and broadcast command. However, it is contemplated that other configurations are possible; for example, these physical buttons 409 and 411 can be eliminated in lieu of soft buttons presented on the display 405.

As mentioned, the media distributor 101 provides a variety of functions to manipulate the video signals stemming from the digital video feed, as next explained. For the purposes of illustration, these functions are described with respect to the device of FIG. 2.

Figure 5:
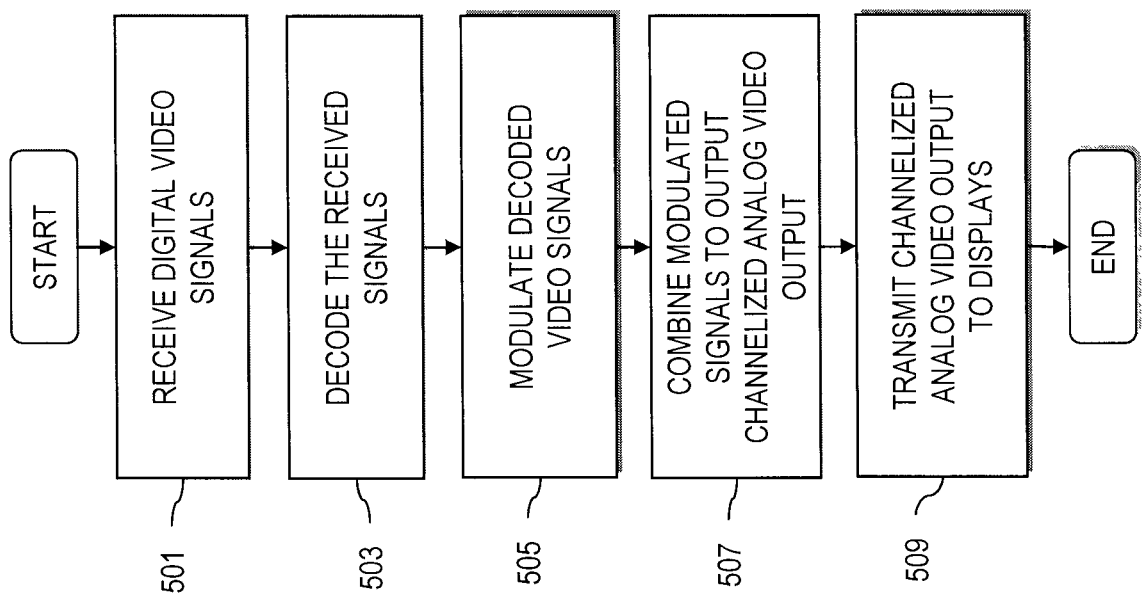
FIG. 5 is a flowchart of a process for distributing video signals, according to an exemplary embodiment.

FIG. 5 is a flowchart of a process for distributing video signals, according to an exemplary embodiment. In step 501, the media distributor 101 receives a digital video signals from the feed 203. The digital video signals are then decoded by the array of digital video decoders 201, as in step 503. The decoded signals are modulated, per step 505, by the corresponding video modulators 205 to output equivalent analog signals. In step 507, these analog signals are combined by the combiner 207 to output a channelized analog video output. This analog output is transmitted, per step 509, over existing wiring to the displays 103.

Figure 6:
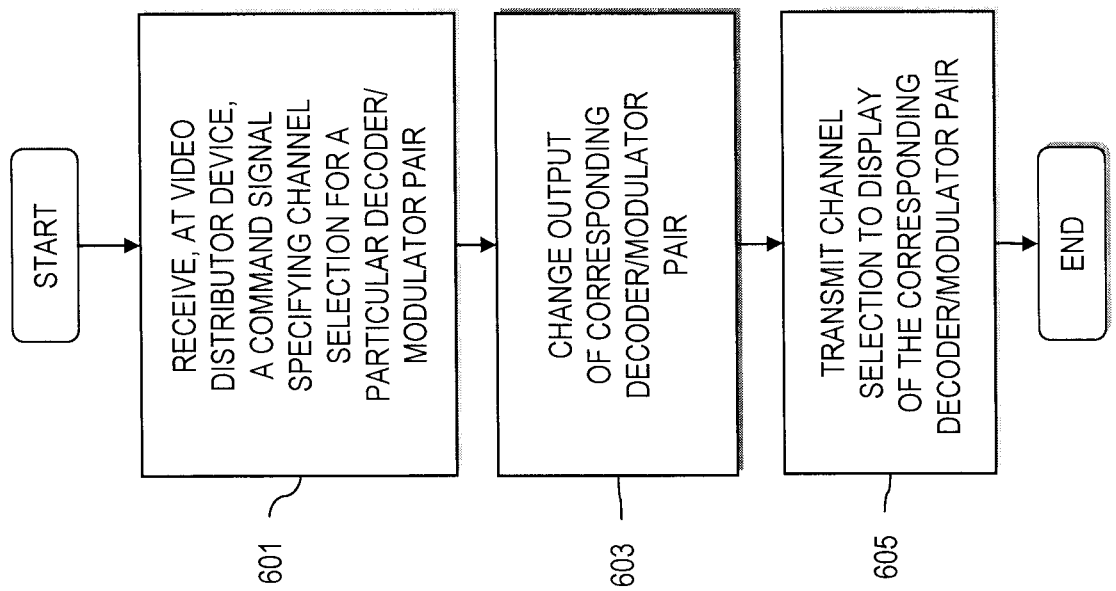
FIG. 6 is a flowchart of a channel selection process provided by the media distributor of FIG. 2, according to an exemplary embodiment.

FIG. 6 is a flowchart of a channel selection process provided by the media distributor of FIG. 2, according to an exemplary embodiment. In this scenario, a user can instruct the media distributor 101 using a remote control device 215 to select a channel for a particular display 103, which is not necessarily the display that is in close proximity to the user. For instance, the user can be located in the kitchen, but yet can select a channel for the display in another room, such as the family room. In step 601, the user inputs a command specifying a channel selection for a particular decoder/modulator pair by using the remote control device 215, for instance. In response to this command (or request), the media distributor 101 changes the output of the corresponding decoder/modulator pair (step 603); in the alternative, the video controller 217 can select the appropriate analog signal corresponding to the selected channel to the video output port of the particular display 213 associated with the user. In step 605, the channel selection is then provided to the display of the corresponding decoder/modulator pair.

Figure 7:
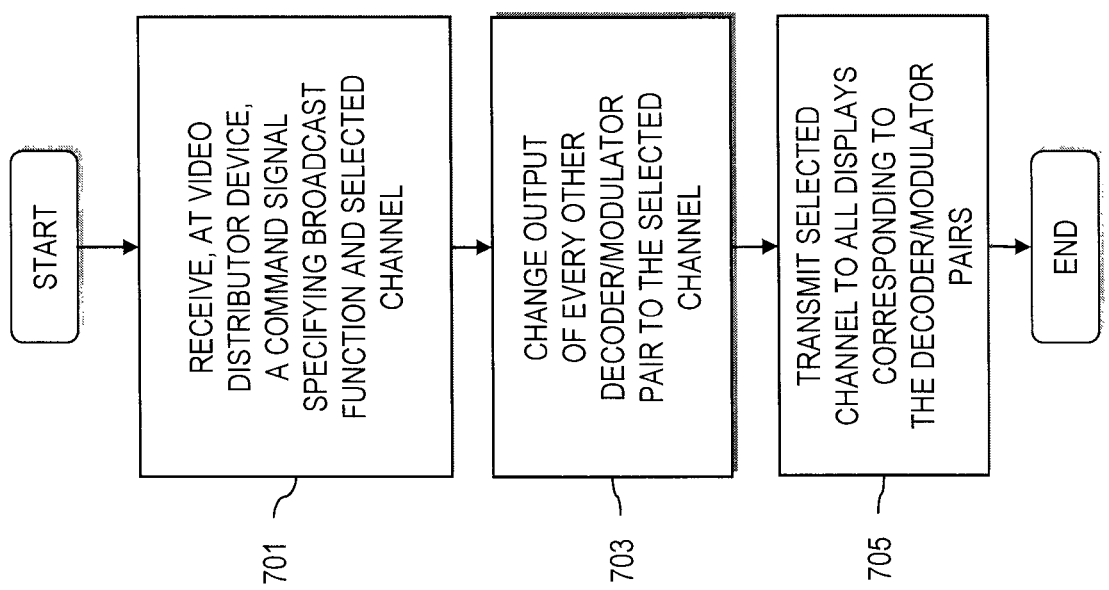
FIG. 7 is a flowchart of a video broadcast process provided by the media distributor of FIG. 2, according to an exemplary embodiment.

FIG. 7 is a flowchart of a video broadcast process provided by the media distributor of FIG. 2, according to an exemplary embodiment. For the broadcast function, the user can initiate this by depressing the broadcast command button 411 (FIG. 4) on the remote control device 215, and utilizing the keypad 401 or cursor controller 403 to specify a particular channel or program that is to be broadcast. Upon receiving the command signal (per step 701), the media distributor 101 changes the output of every other decoder/modulator pairs to the selected channel, as in step 703. In step 705, the displays 103 are thus supplied with this common programming.

Although the above process involves a broadcast function, it is recognized that selective ones of the decoder/modulator pairs can be specified. In such a scenario, not all the displays 103 are showing the selected channel, thereby permitting some displays to view other programs.

Figure 8:
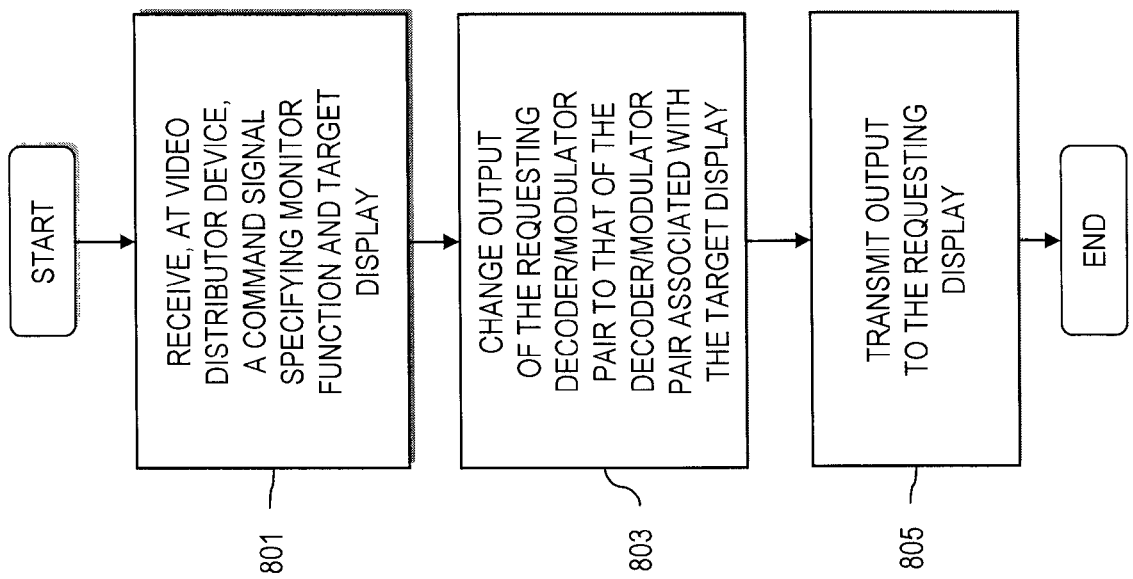
FIG. 8 is a flowchart of a monitoring process provided by the media distributor of FIG. 2, according to an exemplary embodiment.

FIG. 8 is a flowchart of a monitoring process provided by the media distributor of FIG. 2, according to an exemplary embodiment. This feature permits a user, such as a parent, to view the program that is showing on the display of another user, e.g., a child. Turning to the scenario of FIG. 3, a parent within the master bedroom, for example, can monitor what is being viewed in the family room where the child is entertaining his/her friends. This capability permits the parent to leave a child and his/her friends "alone," but yet ensures that no inappropriate content is being viewed. With the convenience of a wireless remote control device (e.g., device 215), the parent can initiate this monitoring function, using the monitor command button 409. The user can specify the target display; that is, the display whose content is to be monitored. The media distributor 101 receives the command signal from the remote control device 215, as in step 801. Next, the media distributor 101 changes the output of the requesting decoder/modulator pair to that of the output the decoder/modulator pair associated with the target display (step 803). The output signal is then transmitted, as in step 805, to the requesting display—i.e., display where the user wishes to view the video signal that is being shown at the target display.

The above described processes relating to providing video services using a media distributor may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
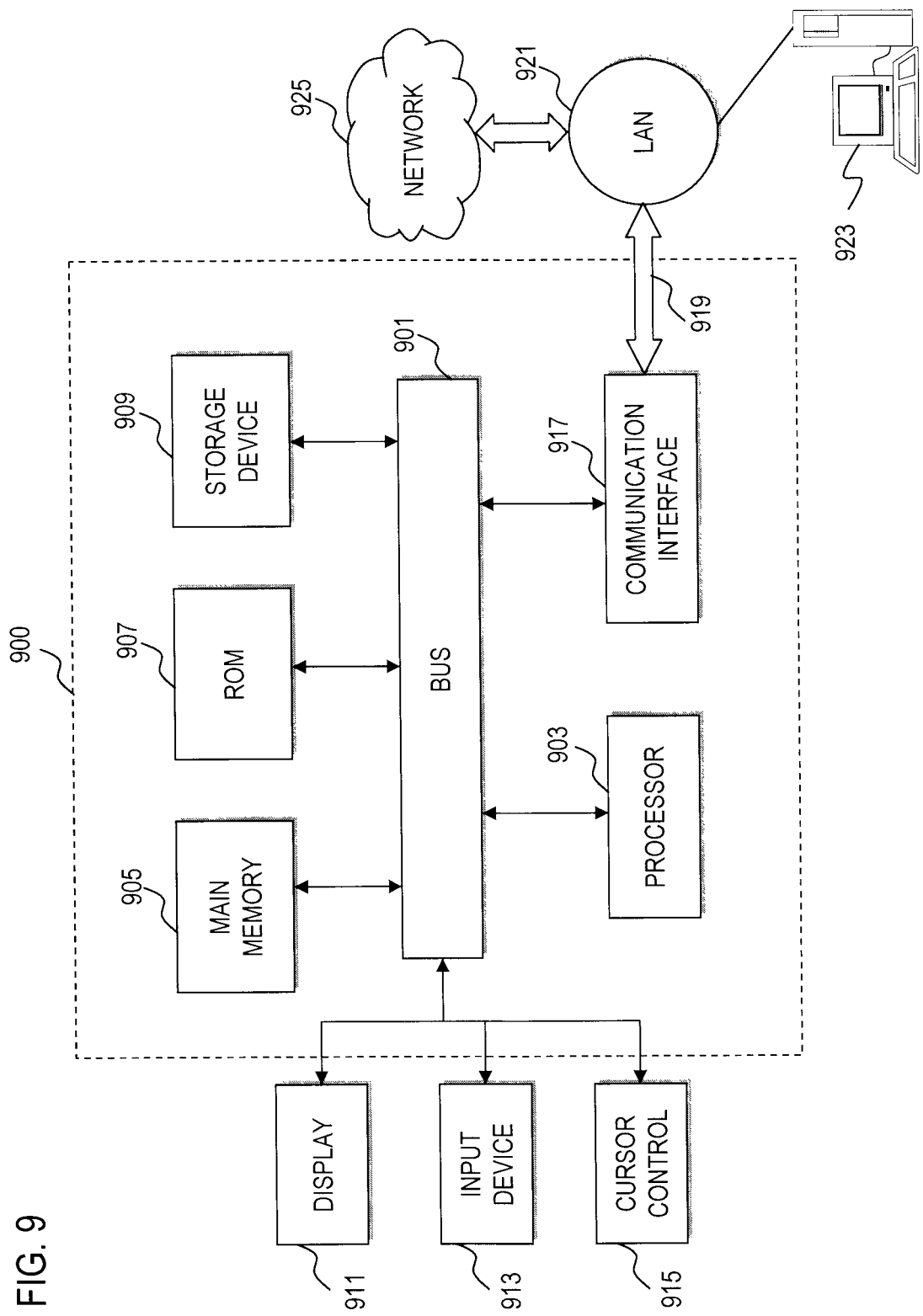
FIG. 9 is a diagram of a computer system that can be used to implement various exemplary embodiments.

FIG. 9 illustrates a computer system 900 upon which an exemplary embodiment can be implemented. For example, the processes described herein can be implemented using the computer system 900. The computer system 900 includes a bus 901 or other communication mechanism for communicating information and a processor 903 coupled to the bus 901 for processing information. The computer system 900 also includes main memory 905, such as a random access memory (RAM) or other dynamic storage device, coupled to the bus 901 for storing information and instructions to be executed by the processor 903. Main memory 905 can also be used for storing temporary variables or other intermediate information during execution of instructions by the processor 903. The computer system 900 may further include a read only memory (ROM) 907 or other static storage device coupled to the bus 901 for storing static information and instructions for the processor 903. A storage device 909, such as a magnetic disk or optical disk, is coupled to the bus 901 for persistently storing information and instructions.

The computer system 900 may be coupled via the bus 901 to a display 911, such as a cathode ray tube (CRT), liquid crystal display, active matrix display, or plasma display, for displaying information to a computer user. An input device 913, such as a keyboard including alphanumeric and other keys, is coupled to the bus 901 for communicating information and command selections to the processor 903. Another type of user input device is a cursor control 915, such as a mouse, a trackball, or cursor direction keys, for communicating direction information and command selections to the processor 903 and for controlling cursor movement on the display 911.

According to an embodiment, the processes described herein are performed by the computer system 900, in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multi-processing arrangement may also be employed to execute the instructions contained in main memory 905. In alternative embodiments, hard-wired circuitry may be used in place of or in combination with software instructions to implement the exemplary embodiment. Thus, exemplary embodiments are not limited to any specific combination of hardware circuitry and software.

The computer system 900 also includes a communication interface 917 coupled to bus 901. The communication interface 917 provides a two-way data communication coupling to a network link 919 connected to a local network 921. For example, the communication interface 917 may be a digital subscriber line (DSL) card or modem, an integrated services digital network (ISDN) card, a cable modem, a telephone modem, or any other communication interface to provide a data communication connection to a corresponding type of communication line. As another example, communication interface 917 may be a local area network (LAN) card (e.g. for Ethernet™ or an Asynchronous Transfer Model (ATM) network) to provide a data communication connection to a compatible LAN. Wireless links can also be implemented. In any such implementation, communication interface 917 sends and receives electrical, electromagnetic, or optical signals that carry digital data streams representing various types of information. Further, the communication interface 917 can include peripheral interface devices, such as a Universal Serial Bus (USB) interface, a PCMCIA (Personal Computer Memory Card International Association) interface, etc. Although a single communication interface 917 is depicted in FIG. 9, multiple communication interfaces can also be employed.

The network link 919 typically provides data communication through one or more networks to other data devices. For example, the network link 919 may provide a connection through local network 921 to a host computer 923, which has connectivity to a network 925 (e.g. a wide area network (WAN) or the global packet data communication network now commonly referred to as the "Internet") or to data equipment operated by a service provider. The local network 921 and the network 925 both use electrical, electromagnetic, or optical signals to convey information and instructions. The signals through the various networks and the signals on the network link 919 and through the communication interface 917, which communicate digital data with the computer system 900, are exemplary forms of carrier waves bearing the information and instructions.

The computer system 900 can send messages and receive data, including program code, through the network(s), the network link 919, and the communication interface 917. In the Internet example, a server (not shown) might transmit requested code belonging to an application program for implementing an exemplary embodiment through the network 925, the local network 921 and the communication interface 917. The processor 903 may execute the transmitted code while being received and/or store the code in the storage device 909, or other non-volatile storage for later execution. In this manner, the computer system 900 may obtain application code in the form of a carrier wave.

The term "computer-readable medium" as used herein refers to any medium that participates in providing instructions to the processor 903 for execution. Such a medium may take many forms, including but not limited to non-volatile media, volatile media, and transmission media. Non-volatile media include, for example, optical or magnetic disks, such as the storage device 909. Volatile media include dynamic memory, such as main memory 905. Transmission media include coaxial cables, copper wire and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the various exemplary embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that flow. The specification and the drawings are accordingly to be regarded in an illustrative rather than restrictive sense.

What is claimed is:

1. A method comprising:
receiving a digital video feed at a customer premises equipment that includes a plurality of decoders and a corresponding plurality of modulators, wherein the digital video feed includes a plurality of video channels;
decoding, by the decoders, the digital video feed to output analog video signals;
modulating, by the modulators, the analog video signals; and
combining outputs of the modulators to generate a channelized video signal.

2. A method according to claim 1, further comprising:
transmitting the channelized video signal to a plurality of displays.

3. A method according to claim 1, further comprising:
receiving a command signal, from a remote control device, specifying selection of one of the video channels.

4. A method according to claim 1, further comprising:
receiving a command signal, from a remote control device, specifying broadcast of one of the video channels to one or more displays.

5. A method according to claim 1, further comprising:
receiving a video signal from a video source different from the digital video feed.

6. An apparatus comprising:
a plurality of decoders, at a customer premises equipment, configured to decode a digital video feed to output analog video signals, wherein the digital video feed includes a plurality of video channels;
a plurality of modulators coupled respectively to the decoders, the modulators being configured to modulate the analog video signals; and
a combiner configured to combine outputs of the modulators to generate a channelized video signal.

7. An apparatus according to claim 6, wherein the channelized video signal is transmitted to a plurality of displays.

8. An apparatus according to claim 6, further comprising:
a video controller coupled to the combiner for outputting the channelized video signal; and
a remote control circuit coupled to the video controller and configured to receive a command signal, from a remote control device, specifying selection of one of the video channels.

9. An apparatus according to claim 6, further comprising:
a video controller coupled to the combiner for outputting the channelized video signal; and
a remote control circuit configured to receive a command signal, from a remote control device, specifying broadcast of one of the video channels to one or more displays.

10. An apparatus according to claim 6, further comprising:
a video input coupled to the combiner and configured to receive a video signal from a video source different from the digital video feed.

11. A method comprising:
receiving content from one or more content providers;
generating a digital video feed based on the received content; and
providing the digital video feed to a customer premises equipment over a transmission facility, wherein the customer premises equipment is configured to, decode the digital video feed to output analog video signals, modulate the analog video signals, and combine the modulated analog video signals to generate a channelized video signal.

12. A method according to claim 11, wherein the customer premises equipment is further configured to transmit the channelized video signal to a plurality of displays.

13. A method according to claim 11, wherein the customer premises equipment is further configured to receive a command signal, from a remote control device, specifying selection of one of the video channels.

14. A method according to claim 11, wherein the customer premises equipment is further configured to receive a command signal, from a remote control device, specifying broadcast of one of the video channels to one or more displays.

15. A method according to claim 11, wherein the customer premises equipment is further configured to receive a video signal from a video source different from the digital video feed.

16. A system comprising:
a network element configured to receive content from one or more content providers and to generate a digital video feed based on the received content, wherein the digital video feed is provided to a customer premises equipment over a transmission facility, wherein the customer premises equipment is configured to, decode the digital video feed to output analog video signals, modulate the analog video signals, and combine the modulated analog video signals to generate a channelized video signal.

17. A system according to claim 16, wherein the customer premises equipment is further configured to transmit the channelized video signal to a plurality of displays.

18. A system according to claim 16, wherein the customer premises equipment is further configured to receive a command signal, from a remote control device, specifying selection of one of the video channels.

19. A system according to claim 16, wherein the customer premises equipment is further configured to receive a command signal, from a remote control device, specifying broadcast of one of the video channels to one or more displays.

20. A system according to claim 16, wherein the customer premises equipment is further configured to receive a video signal from a video source different from the digital video feed.

* * * * *